(12) United States Patent
Vazquez et al.

(10) Patent No.: US 9,672,428 B2
(45) Date of Patent: Jun. 6, 2017

(54) SYSTEMS AND METHODS FOR DETECTING FREE-STANDING GROUPS OF INDIVIDUALS

(71) Applicant: Disney Enterprises, Inc., Burbank, CA (US)

(72) Inventors: Marynel Vazquez, Pittsburgh, PA (US); Scott Hudson, Pittsburgh, PA (US); Aaron Steinfeld, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 81 days.

(21) Appl. No.: 14/852,139

(22) Filed: Sep. 11, 2015

(65) Prior Publication Data
US 2017/0076157 A1    Mar. 16, 2017

(51) Int. Cl.
*G06K 9/00* (2006.01)
*G06T 7/00* (2017.01)
(Continued)

(52) U.S. Cl.
CPC ....... *G06K 9/00778* (2013.01); *G06K 9/6296* (2013.01); *G06T 7/004* (2013.01);
(Continued)

(58) Field of Classification Search
USPC ........ 382/100, 103, 106–107, 115, 153, 155, 382/162, 168, 173, 181, 190, 199, 217,
(Continued)

(56) References Cited

U.S. PATENT DOCUMENTS

| 7,961,174 B1 * | 6/2011 | Markovic | G06F 3/017 |
| | | | 345/158 |
| 2008/0136900 A1 * | 6/2008 | Grasnick | H04N 13/0404 |
| | | | 348/51 |

(Continued)

OTHER PUBLICATIONS

"F-formation Detection: Individuation Free-Standing Conversational Groups in Images" Sep. 2014, pp. 1-32.*
(Continued)

*Primary Examiner* — Seyed Azarian
(74) *Attorney, Agent, or Firm* — Farjami & Farjami LLP

(57) ABSTRACT

There is provided a system and method for grouping a plurality of individuals, each individual of the plurality of individuals having a corresponding transactional segment, the system comprising a memory storing a group identification application, a processor for executing the group identification application to identify an o-space center of a first group, wherein the o-space center is an intersection of a plurality of transactional segments, obtain a non-parametric lower-body orientation probability distribution for each of the plurality of individuals, based on the o-space center, and determine that a first plurality of individuals from the plurality of individuals belong to the first group based on the non-parametric lower-body orientation probability distribution of each individual of the plurality of individuals, wherein each of the first plurality of individuals has a corresponding one of the plurality of transactional segments that intersect with one another.

19 Claims, 7 Drawing Sheets

(51) Int. Cl.
*G06T 7/20* (2017.01)
*G06K 9/62* (2006.01)
*G09G 5/00* (2006.01)

(52) U.S. Cl.
CPC ...... *G06T 7/20* (2013.01); *G06T 2207/10004* (2013.01); *G06T 2207/10016* (2013.01); *G06T 2207/20076* (2013.01); *G06T 2207/30196* (2013.01); *G06T 2207/30232* (2013.01); *G06T 2207/30241* (2013.01)

(58) Field of Classification Search
USPC ............... 382/220, 224, 232, 254, 274, 276, 382/286–291, 305, 312; 345/158, 633, 345/420; 434/252; 348/51
See application file for complete search history.

(56) References Cited

U.S. PATENT DOCUMENTS

| | | | |
|---|---|---|---|
| 2010/0081116 A1* | 4/2010 | Barasch | A63B 24/0003 434/252 |
| 2013/0271458 A1* | 10/2013 | Andriluka | G06K 9/00342 345/420 |
| 2014/0063061 A1* | 3/2014 | Reitan | G09G 3/003 345/633 |
| 2014/0270363 A1* | 9/2014 | Chakraborty | G06K 9/00248 382/103 |

OTHER PUBLICATIONS

Bazanni et al. "Social Interactions by Visual Focus of Attention in a 3D Environment", ExpertSystems2013, pp. 1-13.
Cristani et al. "Social Interaction Discovery by Statistical Analysis of F-formation", BMVC 2011, pp. 1-12.
Flohr et al. "A Probabilistic Framework for Joint Pedestrian Head and Body Orientation Estimation", IEEE 2015, pp. 1-11.
Hung et al. "Detecting F-formation as Dominant Sets", ICMI 2011 pp. 1-8.
Maji et al. "Action Recognition from a Distributed Representation of Pose and Appearance", CVPR 2010, pp. 3177-3184.
Newman et al. "Modularity and Community Structure in Networks" Jun. 6, 2006, pp. 1-6.
Setti et al. "F-formation Detection: Individuation Free-Standing Conversational Groups in Images" Sep. 2014, pp. 1-32.
Vazquez et al. "Social Group Interactions in a Role-Playing Game" Mar. 2015, pp. 1-2.
Yu et al. "Monitoring, Recognizing and Discovering Social Networks" IEEE 2009, pp. 1-8.
Carreira et al. "Mode-finding for mixtures of Gaussian distributions" Aug. 4, 2000, pp. 1-23.
Fathi et al. "Social Interactions: A First-Person Perspective" CVPR 2012, pp. 1-8.
Gan et al. "Temporal Encoded F-formation System for Social Interaction Detection" Oct. 2013, pp. 1-10.
Luber et al. "Multi-Hypothesis Social Grouping and Tracking for Mobile Robots" RSS 2009, pp. 1-8.
Mead et al. "Automated Proxemic Feature Extraction and Behavior Recognition: Applications in Human-Robot Interaction" May 2013, pp. 367-378.
Park et al. "3D Social Saliency from Head-mounted Cameras" NIPS 2012, pp. 1-9.
Setti et al. "Multi-Scale F-Formation Discovery for Group Detection" IEEE 2013, pp. 3547-3551.
Mohammad Abu Yousuf "Mobile Museum Guide Robots Able to Create Spatial Formations with Multiple Visitors" Sep. 2013, pp. 1-181.

* cited by examiner

SYSTEMS AND METHODS FOR DETECTING FREE-STANDING GROUPS OF INDIVIDUALS

BACKGROUND

As interactive technology becomes more prevalent, more devices are able to detect and interact with people. One important aspect of interacting with people is to determine whether an individual is a member of a group. Existing algorithms for detecting free-standing conversational groups exploit the fact that the members tend to cooperate to sustain a shared focus of attention, and/or maintain a particular spatial-orientation that maximizes their opportunities to monitor each other's mutual perceptions. These methods typically rely on the focus of attention based on the direction group members are looking, and how closely individuals stand to each other for extended periods.

SUMMARY

The present disclosure is directed to systems and methods for detecting free-standing groups of individuals, substantially as shown in and/or described in connection with at least one of the figures, as set forth more completely in the claims.

DETAILED DESCRIPTION

Figure 1:
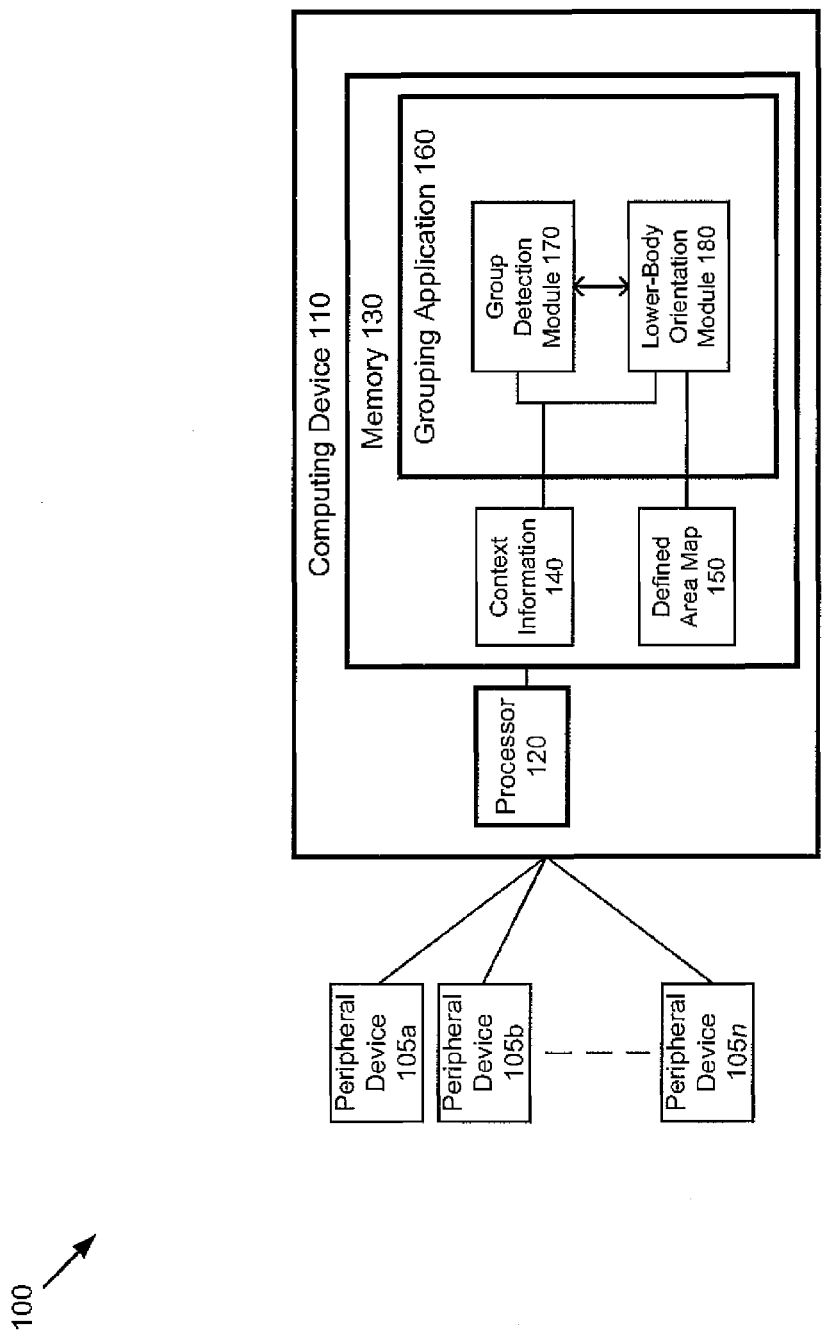
FIG. 1 shows an exemplary system for detecting free-standing groups of individuals, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows exemplary system 100 for detecting free-standing groups of individuals, according to one implementation of the present disclosure. System 100 includes a plurality of peripheral devices 105a-105n and computing device 110. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes context information 140, defined area map 150, and grouping application 160.

Peripheral devices 105 may include a peripheral device or a plurality of peripheral devices, such as peripheral device 105a, peripheral device 105b, . . . , peripheral device 105n. In some implementations, peripheral device 105 may be an input device, such as a microphone, a camera, a keyboard, a mouse, or other peripheral device suitable for receiving or gathering input, such as images or videos of an area near to or surrounding computing device 110. Peripheral device 105 may include and output device such as a digital display, a speaker, a plurality of speakers, or any output device suitable for communicating information to an individual who may be sufficiently near computing device 110 to receive the communication. Peripheral device 105 may include arms, legs, wheels, treads, tracks, or other devices suitable for moving through or manipulating the environment around computing device 110. It should be noted that in listing peripheral devices 105a-105n, the index "n" denotes an integer number.

Computing device 110 may be a device for interacting with an individual or a plurality of individuals, and may be a stationary device or moveable. In some implementations, computing device 110 may be a robot for interacting with individuals, and may interact with individuals in a defined area, such as a room or an area near an entrance or exit of an amusement park. In other implementations, computing device 110 may be an interactive advertisement, such as a poster designed to communicate with or interact with an individual or a plurality of individuals standing or walking nearby.

Context information 140 may include information about an area surrounding computing device 110. In some implementations, context information 140 may include a position of each of a plurality of individuals located near computing device 110. Context information may include locations of objects of interest that an individual may interact with, such as a television, a sign, or other object that may be the focus of an individual's attention. In addition to information about the environment, context information 140 may include information about an individual or a plurality of individuals, such as a position of each individual, a velocity of each individual, and/or a head orientation of each individual.

Defined area map 150 may include a map of a defined area near to or surrounding computing device 110. In some implementations, the defined area may be an area that does not include computing device 110, such as an area in front of computing device 110, an area behind computing device 110, or an area next to computing device 110. In other implementations, the defined area may include an area surrounding computing device 110, such as when computing device 110 is a robot located in a room and the defined area is the room. Defined area map 150 may include the floor plan of the room, the location of any obstacles or fixtures in the room, and the location of any static foci in the room, such as the location of a television or other objects of interest that may capture the attention of an individual.

Grouping application 160 is a computer algorithm for identifying groups of individuals, which is stored in memory 130 for execution by processor 120. In some implementations, grouping application 160 may identify groups of individuals, such as freestanding conversational groups. Freestanding conversational groups are an example of focused encounters, and may emerge during social occasions, such as a party, a social dinner, a coffee break, a visit in a museum, at the mall, a walk in the city plaza, or at an amusement park. More generally, freestanding conversational groups may form when individuals spontaneously decide to be in each other's immediate presence to interact with one another. Grouping application 160 includes group detection module 170 and lower-body orientation module 180.

Group detection module 170 is a computer code module for detecting groups of individuals. Group detection module 170 may run concurrently with, and in parallel with, lower-body orientation module 180. In some implementations, group detection module 170 may receive information from lower-body orientation module 180, such as a lower-body orientation of a plurality of individuals, which may include a non-parametric lower-body orientation distribution. In some implementations, group detection module 170 may receive input from peripheral device 105 to detect a plurality of individuals in an area, and may detect a group or a plurality of groups among the plurality of individuals.

Lower-body orientation module 180 is a computer code module for obtaining a lower-body orientation of an individual. Lower-body orientation module 180 may run concurrently with, and in parallel with, group detection module 170. In some implementations, lower-body orientation module 180 may receive information from group detection module 170, such as a plurality of individuals that belong to a group, a plurality of o-space centers corresponding to a plurality of groups, and/or a plurality of proposed o-space centers corresponding to a plurality of individuals in a defined area. Information received from group detection module 170 may be used to update and track the lower-body orientations of individuals.

In some implementations, lower-body orientation module 180 may obtain a lower-body orientation of each individual near computing device 110. In some implementations, the lower-body orientation of an individual may include a non-parametric lower-body orientation distribution. Lower-body orientation module 180 may track the lower-body orientation of a plurality of individuals, and/or obtain a lower-body orientation probability distribution for an individual or a plurality of individuals based on an o-space center, the map of the defined area, and/or a head orientation of each individual. In some implementations, lower-body orientation module 180 may obtain a non-parametric lower-body orientation distribution based on an o-space center, the map of the defined area, and/or the head orientation of each individual.

Figure 2:
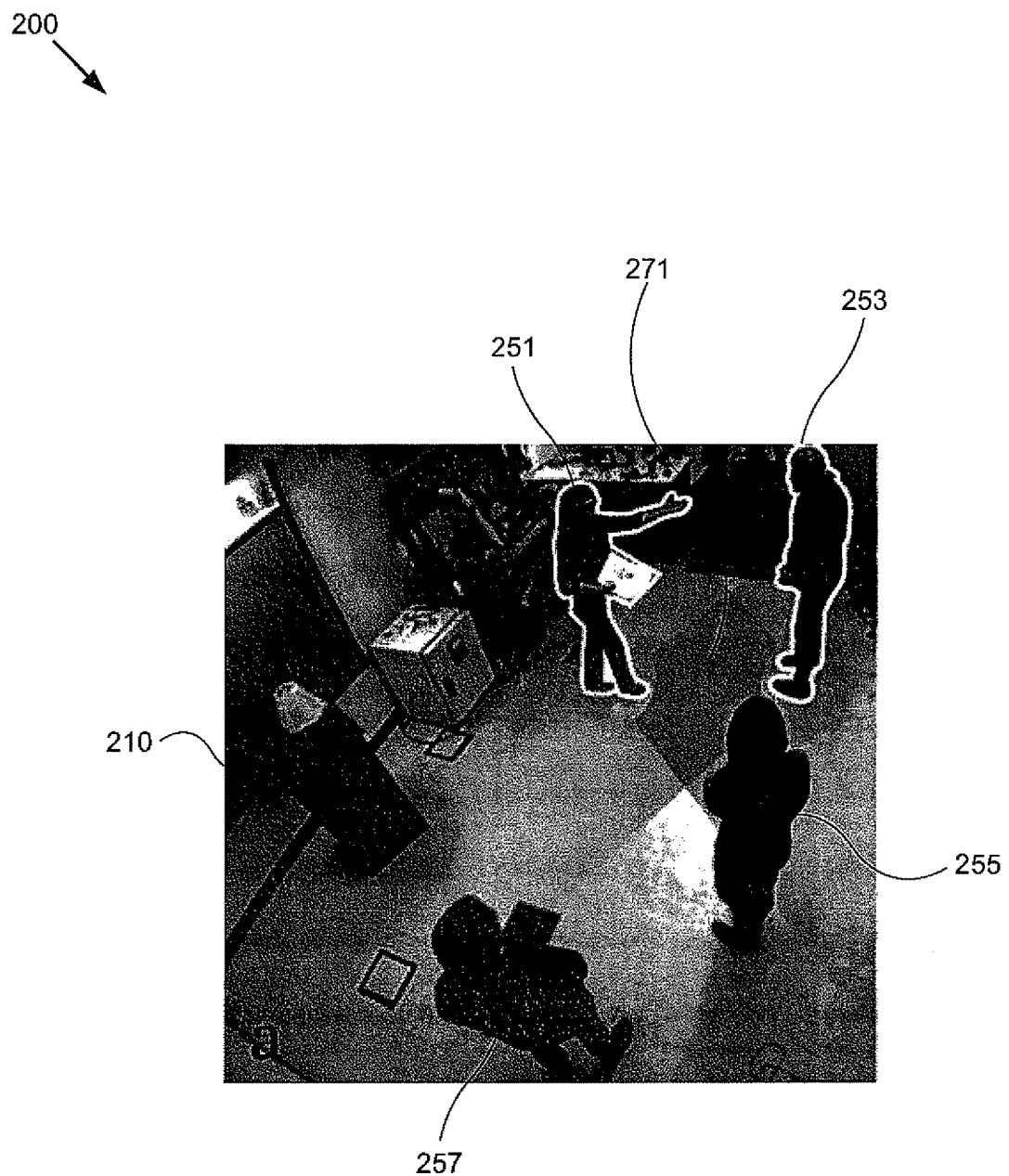
FIG. 2 shows an exemplary environment including the system of FIG. 1 for detecting free-standing groups of individuals, according to one implementation of the present disclosure.

FIG. 2 shows an exemplary environment including the system of FIG. 1, according to one implementation of the present disclosure. Diagram 200 shows individuals 251, 253, 255, and 257 standing in a room with computing device, depicted as a furniture robot 210. Although each individual has a corresponding transactional segment, FIG. 2 only shows the transactional segments corresponding to individual 251 and individual 253, with each individual's transactional segment projected towards the other as illustrated by the shaded areas projected on the floor of the room. A transactional segment refers to the region in front of the individual's body that limbs can reach easily, and in which hearing and sight are most effective. The area where the transactional segments of individual 251 and individual 253 overlap forms o-space 271. An o-space of a group, in one implementation, may be a convex empty space surrounded by individuals involved in a social interaction, where every participant looks inward into the o-space, and no external individuals are allowed in the o-space. O-space 271 represents the overlap between the transactional segments of individual 251 and individual 253. Such an arrangement of individuals may be considered an F-formation, where an F-formation is a group of two or more individuals oriented such that they have equal, direct, and exclusive access to the space between them. There can be different configurations for F-formations. In the case of two participants, typical F-formation arrangements are vis-a-vis, L-shape, and side-by-side. When there are more than three participants, a circular formation is typically formed.

As shown in FIG. 2, individual 255 and individual 257 do not belong to any group because their corresponding transactional segments do not intersect any other transactional segments and do not intersect an o-space center. Because of the social interactions of each individual 251-257, furniture robot 210 may appropriately interact with either of individual 255 or individual 257, but it may be inappropriate for furniture robot 210 to interact with, suddenly approach individuals 251 and 253, or pass through o-space 271 between individuals 251 and 253. In some implementations, furniture robot 210 may obtain and track the lower-body orientation of individual 251, individual 253, individual 255, and individual 257. By tracking the lower-body orientation of each individual 251-257, furniture robot 210 may detect a change in the lower-body orientation of one of the individuals, which may indicate that the corresponding individual is about to join or leave the group.

Figure 3:
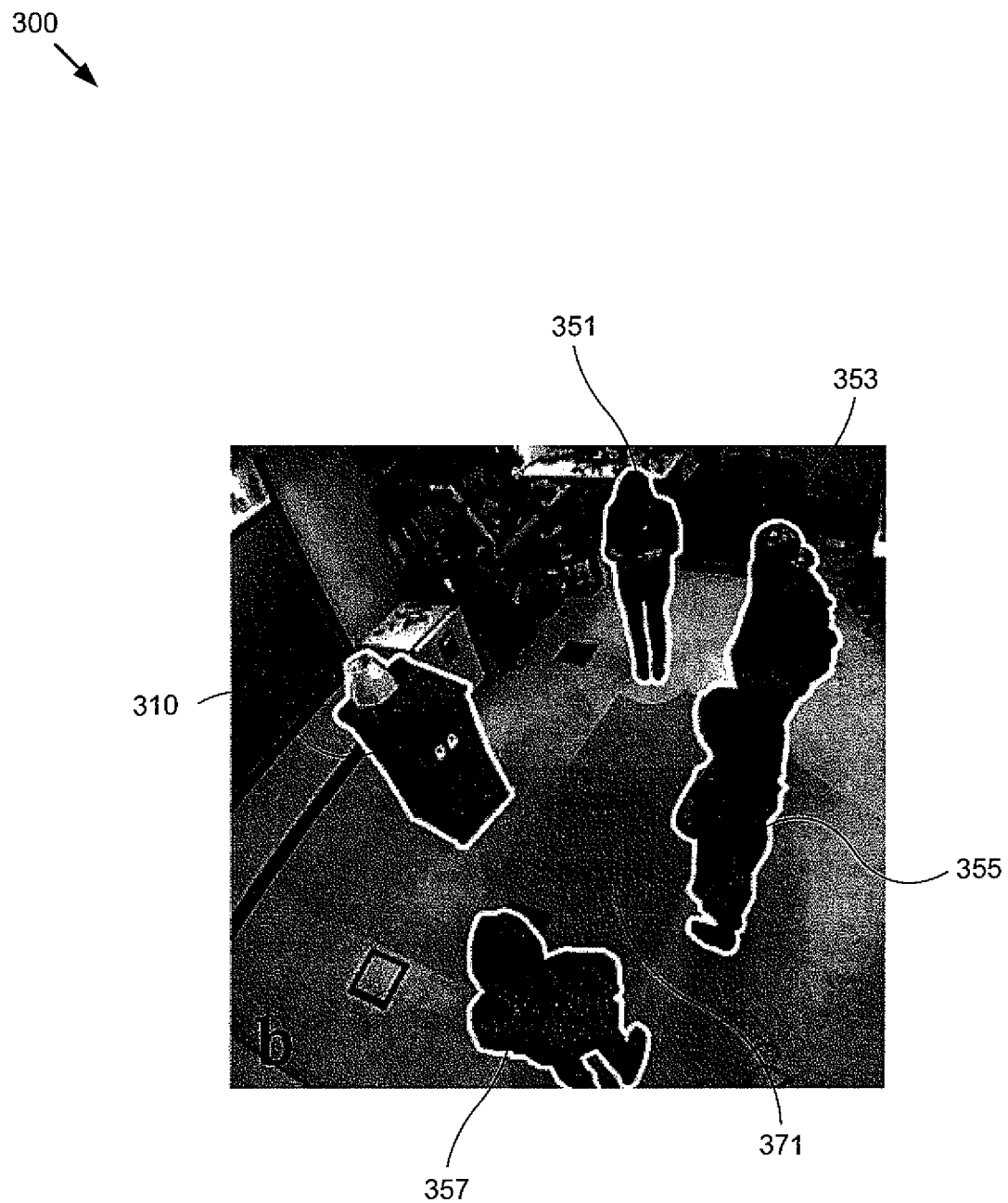
FIG. 3 shows another exemplary environment including the system of FIG. 1 for detecting free-standing groups of individuals, according to one implementation of the present disclosure.

FIG. 3 shows another exemplary environment including the system of FIG. 1, according to one implementation of the present disclosure. The group arrangement is different from the arrangement shown in FIG. 2, in that the transactional segments corresponding to individuals 351-357, and the transactional segment corresponding to furniture robot 310, overlap forming o-space 371. FIG. 3 depicts an F-formation to which individuals 351-357 all belong, and furniture robot 310 may interact with individuals 351-357. An exemplary F-formation detection approach of the present disclosure is also shown in Algorithm 1 below. In some implementations, furniture robot may obtain and track the lower-body orientation of individual 351, individual 353, individual 355, and individual 357. By tracking the lower-body orientation of each individual 351-357, furniture robot 310 may detect a change in the lower-body orientation of one of the individuals, which may indicate that the corresponding individual is about to leave the group.

Figure 4:
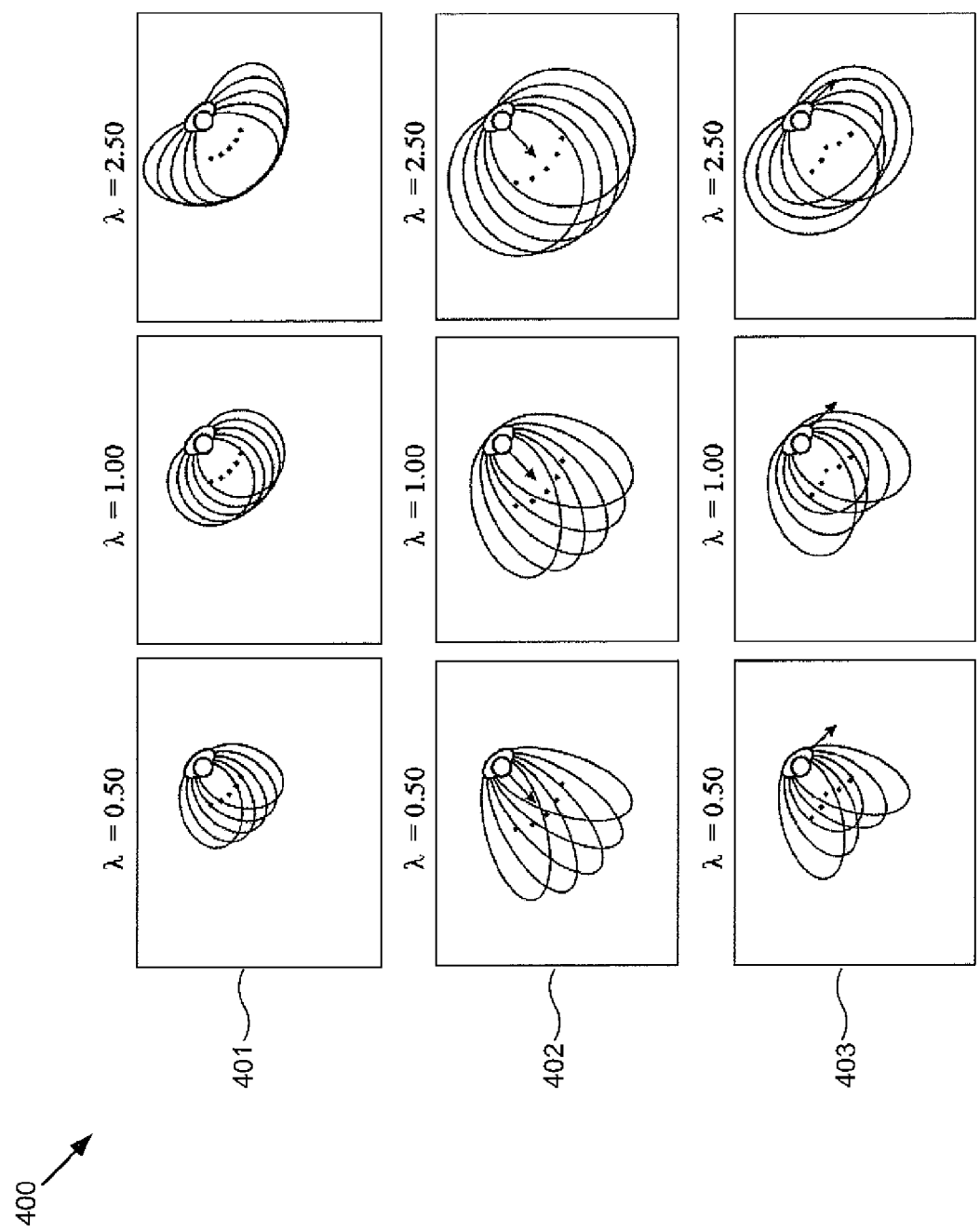
FIG. 4 shows a diagram depicting a step in an exemplary grouping analysis, according to one implementation of the present disclosure.

FIG. 4 shows a diagram depicting a step in an exemplary grouping analysis, according to one implementation of the present disclosure. In order to group individuals, grouping application 160 may begin with proposing a plurality of o-spaces for each individual of a plurality of individuals. Grouping application 160 may consider an individual i with a corresponding lower-body orientation distribution $\Phi^i = \{\phi_j^i | 1 \leq j \leq N\}$, with each $\phi_j^i \in [0, 2\pi]$ with respect to the horizontal axis of the world coordinate frame. The proposed o-space location for $\phi_j^i$ is modeled under a normal distribution $N = (\mu_j^i, \Sigma_j^i)$ with:

$$\mu_j^i = p^i + R \begin{bmatrix} \text{stride} + f(\text{abs}(d1^T v^i)) \\ 0 \end{bmatrix} \quad (1)$$

$$\sum_j^i = R \begin{bmatrix} \sigma_x^j & 0 \\ 0 & \sigma_y^j \end{bmatrix} R^T \quad (2)$$

$$\text{where } R = \begin{bmatrix} \cos(\phi_j^i) & -\sin(\phi_j^i) \\ \sin(\phi_j^i) & \cos(\phi_j^i) \end{bmatrix} \text{ and } d1 = \begin{bmatrix} \cos(\phi_j^i) \\ \sin(\phi_j^i) \end{bmatrix}$$

The vectors $p^i$ and $v^i$ are the position and velocity of the individual i with respect to the world coordinate frame, and the stride parameter represents the likely distance of the o-space center from his or her lower body when the individual is standing still. The function $f: \Re^+ \to [0, d]$ is monotonically increasing, and grouping application 160 may use it to increment the distance between the individual and the proposed o-space center up to an arbitrary maximum value $d \in \Re^+$, based on the individual's velocity and the direction $d1$ of his or her lower body. In particular, grouping application 160 may use $f(x) = 2\sigma(x) - 1$, where $\sigma(x) = 1/(1 + \exp(-x))$ is the standard sigmoid function. With this choice, the o-space can move maximum 1 meter away from a individual when he or she moves forward or backwards. However, the o-space moves little when the individual walks sideways, since the argument $\text{abs}(d1^T v^i)$ approaches zero in this case. grouping application 160 may base this model on the observation that individuals often move forward when approaching an existing group. When they are already members, they sometimes move sideways or backward to allow other individuals to join their F-formation. The components of the covariance matrix $\Sigma_j^i$ are given by:

$$\sigma_x^j = (\text{stride}/s)^2 + g(\text{abs}(d1^T v^i)) \text{ and } \sigma_u^j = \lambda(\text{stride}/s)^2| \quad (3)$$

and with s, $\lambda \in \Re^+ - \{0\}$, and g another increasing function to further control the shape of the normal distribution. Diagram 400 shows a plurality of proposed o-spaces corresponding to five orientations at 0, ±0.25, and ±0.5 radians from the direction of an individual's lower-body orientation. The distributions were computed for various $\lambda$, and fixed stride=0.7 m, s=3 and $g(x) = f(0.5x)$ in equation (3). Row 401 displays results for a velocity of zero. Row 402 shows results for velocity aligned with the direction of the lower-body orientation. Row 403 shows results for velocity perpendicular to the lower-body orientation of the individual. The black dots indicate the mean for each proposed o-space, and the ellipses are drawn at 99% confidence.

Figure 5:
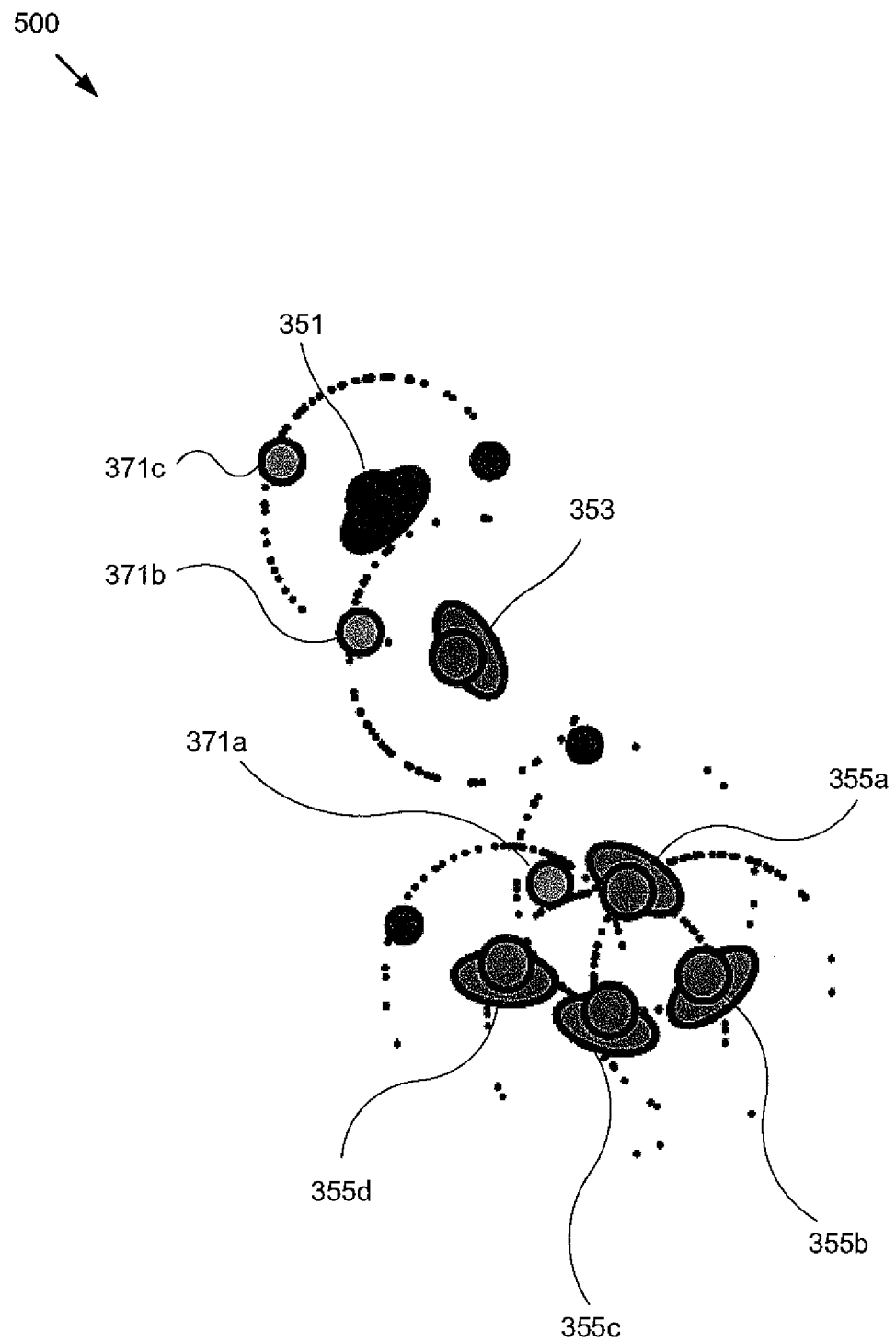
FIG. 5 shows a diagram depicting an exemplary grouping analysis, according to one implementation of the present disclosure.

FIG. 5 shows a diagram depicting an exemplary grouping analysis, according to one implementation of the present disclosure. O-space proposals may be combined into a Gaussian mixture:

$$p(x) = \sum_i^P \sum_j^N \frac{1}{NP} \mathcal{N}(x; \mu_j^i, \Sigma_j^i) \quad (4)$$

where 1/NP is the weight of the components, and $\mu_j^i$ and $\Sigma_j^i$ come from equations (1) and (2), respectively. Grouping application 160 may consider as possible o-space centers the modes of the mixture, as in FIG. 4. Grouping application 160 may find these modes with a fixed-point algorithm, starting from the means of the components. The decision on whether a sample point x has reached a local maxima, as shown at line 12 of Algorithm 1, is based on the Hessian of the mixture at that point, which is easily computed in the case of normal distributions. Note that there might be more modes than mixture components, since the o-space proposal distributions may be anisotropic. In these cases, one may need to sample the mixture more exhaustively than from the means of the components only. In practice, grouping application 160 may do the latter, though, since it provides good results with a reduced computational load. Grouping application 160 may group the modes that are within τ meters from each other, as shown at line 16 of Algorithm 1, and keep track of which component happens, grouping application 160 may pick the mode with highest mixture probability as the possible o-space center in its vicinity. In this manner, the parameter τ helps coping with noise in human motion, as well as in the estimates of lower-body orientation.

| Algorithm 1: Detect F-formations by mode-finding |
|---|
| Input: Position $p^i$ and non-parametric lower-body orientation distribution $\Phi^i = [\phi^i [1],...,\phi^i [N]$ for every person i in the scene ($1 \le i \le P$) |
| Output: Groups $\mathcal{G}$, list $\mathcal{M}$ of possible o-space centers, and lists $\mathcal{S}^i$ of o-space scores for every person |

```
1   χ = ∅ // set of mixture components
2   ω = 1/PN // weight
3   for i = 1 to P do
4   |   for j = 1 to N do
5   |   |   (μ_j^i, Σ_j^i) = ospaceProposal(p^i, φ^i[j])
6   |   |   χ = χ ∪ {(μ_j^i, Σ_j^i, ω)}
7   |   end
8   end
9   M = [ ] // modes (possible o-spaces)
10  for (μ_j^i, Σ_j^i, ω_j^i) in χ do
    |   // hill climb from the mean [20]
11  |   x = fixedPointLoop(μ_j^i, χ)
12  |   if x is local maxima then
13  |   |   (idx, dist) = closestMode(x, M)
14  |   |   if dist < τ then // group modes
15  |   |   |   k = idx
16  |   |   |   if p(M[idx]) < p(x) then M[idx] = x end
17  |   |   else
18  |   |   |   add x to M
19  |   |   |   k = |M|
20  |   |   end
21  |   |   mode_idx_j^i = k // bookkeeping
22  |   end
23  end
    // compute soft assignment scores
24  for i = 1 to P do
25  |   S^i = ||
26  |   for k = 1 to |M| do // initialization
27  |   |   n_k^i = 0
28  |   |   add 0 to S^i
29  |   end
30  |   for j = 1 to N do
31  |   |   if isset(mode_idx_j^i) then
    |   |   |   // reached local maxima
32  |   |   |   k = mode_idx_j^i
33  |   |   |   if visible(M[k], p^i) then
34  |   |   |   |   n_k^i = n_k^i + 1
35  |   |   |   end
36  |   |   end
37  |   end
38  |   if Σ_k n_k^i > 0 then
39  |   |   for k = 1 to |M| do S^i[k] = n_k^i/Σ_k n_k^i end
40  |   end
41  end
    // greedy hard group assignment
42  G = ∅
43  for k = 1 to |M| do
44  |   G = ∅
45  |   for i = 1 to P do
    |   |   // get the most-likely o-space
46  |   |   idx = arg max_m S^i[m]
47  |   |   if S^i[idx] > 0 and k == idx then
48  |   |   |   G = G ∪ {i}
49  |   end
50  end
```

-continued

Algorithm 1: Detect F-formations by mode-finding

```
51        if |G| ≥ 2 then // found group / F-formation
52           𝒢 = 𝒢 ∪ {(G, ℳ[k])}
53        end
54    end
```

Once the likely o-space centers are found, grouping application 160 may count how many mixture components converged per center for each individual, and compute the corresponding o-space score by normalizing this count, as shown at line 39 of Algorithm 1. In order to ensure that the members of an F-formation have direct access to the o-space, grouping application 160 may not consider in this count the modes that are not directly visible to each individual. For this, occlusions may be computed by ray-casting with individuals modeled as circumferences with fixed radius, e.g. 0.2 m. The resulting o-space scores represent a soft group assignment that may be passed to the lower-body orientation module 180. To finally obtain hard group assignments, grouping application 160 may pick the mode with highest score as the most likely o-space center per individual. A group may be determined whenever a proposed o-space center has the highest score for two or more individuals.

Diagram 500 shows the means of each individual's o-space proposals using small dots and groups the individuals based on the corresponding mode probability. Proposed o-space centers 371b and 371c denote proposed o-space centers corresponding to individual 353 and individual 351, respectively; however, neither proposed o-space centers 371b nor 371c represent the highest mode probability for two or more individuals. Accordingly, neither individual 351 nor individual 353 belongs to a group. However, proposed o-space center 371a is the proposed o-space center having the highest mode probability for individuals 355a, 355b, 355c, and 355d. Thus, grouping application 160 may identify individuals 355a-355d as belonging to a group corresponding to o-space center 371a.

Figure 6:
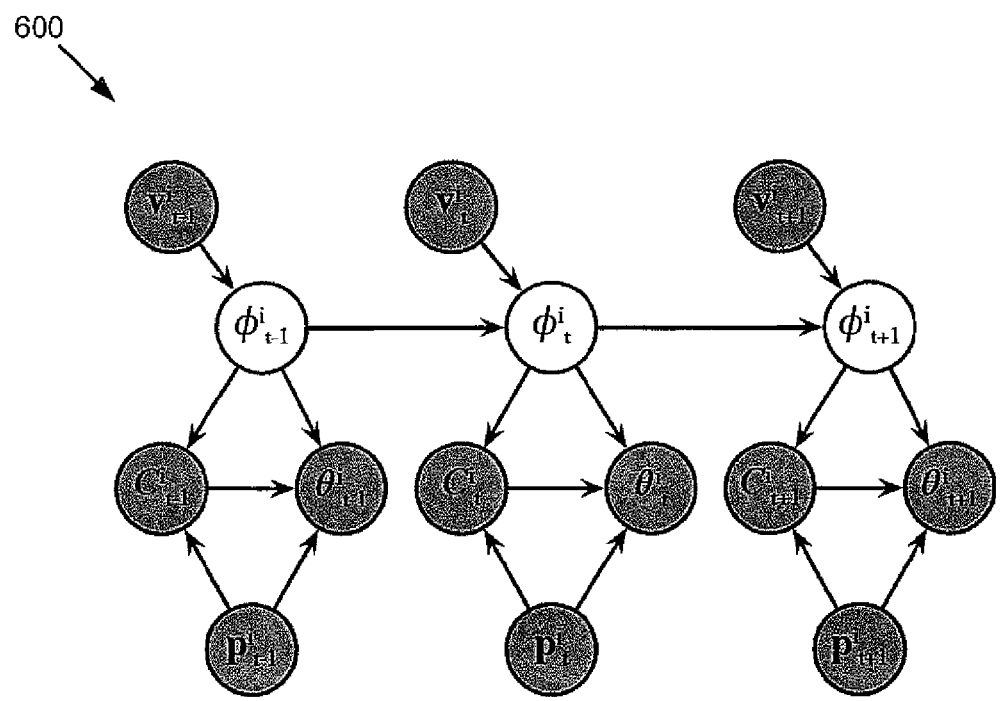
FIG. 6 shows a diagram depicting an exemplary grouping analysis, according to one implementation of the present disclosure.

FIG. 6 shows a diagram of an exemplary grouping analysis, according to one implementation of the present disclosure. In some implementations, grouping application 160 may estimate each individual's lower-body orientation as a tracking problem, based on the following observations: (1) people tend to orient their lower body towards other people or objects of interest while standing still, (2) people often orient their head in the same direction as their lower body, (3) people can turn their heads temporarily to attend to visible targets other than their main focus of attention, and (4) people tend to orient their lower body towards their direction of motion while walking. In general, grouping application 160 may assume that people are standing at all times, as is often the case in freestanding conversations, and that the likely o-space centers and corresponding assignment scores are given for each person, e.g., as output by group detection module 170.

At time t, grouping application 160 may independently estimate the probability distribution of each individual is lower body orientation $\phi_t^i$. Grouping application 160 may model the problem as a Markov chain, see FIG. 5, given the individual's velocity $v^i$, position $p^i$, head orientation $\theta^i$, and contextual information $C^i$ from time step 1 up to t. The contextual information includes the position $p^j$ of the other individuals, the objects O with which the individual may interact, the o-space centers M and the assignment scores $S^i[k]$, for $1 \leq k \leq |M|$.

The belief $bel(\phi_t^i)$ at time t can be formulated recursively:

$$bel(\phi_t) = p(\phi_t \mid v_{1:t}, \theta_{1:t}, C_{1:t}, p_{1:t}) = \quad (5)$$

$$\eta p(\theta_t \mid \phi_t, C_t, p_t) p(C_t \mid \phi_t, p_t) \int p(\phi_t \mid \phi_{t-1}, v_t) bel(\phi_{t-1}) d\phi_{t-1}$$

where the superscript i has been dropped for simplicity. In this factorization, $\eta$ is a normalization term, $p(\theta_t|\phi_t,C_t,p_t)$ is the head measurement probability, $p(C_t|\phi_t,p_t)$ is the context probability, and $p(\phi_t|\phi_{t-1}, v_t)$ is the state transition probability.

Grouping application 160 may use a particle filter to approximate the posterior $bel(\phi_t)$ with a finite number of samples $\Phi_t=[\phi_t[1], \ldots, \phi_t[N]]$, which grouping application 160 may initialize from a uniform VM(0,0). At any following time step t, grouping application 160 may follow Algorithm 2, shown below, to update the belief. First, grouping application 160 may sample new particles given the transition probability and the previous distribution $\Phi_{t-1}$, as shown at line 3 of Algorithm 2. Then, grouping application 160 may compute a weight $w_t$, or importance factor, for each particle based on the context and head measurement probabilities, as shown at line 4 of Algorithm 2 Finally, grouping application 160 may use low variance sampling to draw particles with replacement based on the weights, as shown at lines 7-10 of Algorithm 2. In some implementations, grouping application 160 may use low variance sampling.

Algorithm 2: Particle filter for lower-body orientation

```
      Input: Φ_{t-1}, v_t, C_t, θ_t
      Output: Φ_t
 1    Φ_t = Φ_t = [ ]
 2    for j = 1 to N do
 3        sample φ_t[j] ~ p(φ_t|φ_{t-1}[j], v_t)
 4        ω_t[j] = p(θ_t | φ_t [j], C_t, p_t) p(C_t | φ_t [j], p_t)
 5        add (φ_t [j], ω_t [j]) to Φ̄_t
 6    end
 7    for j = 1 to N do
 8        draw k with probability ∝ ω_t [j]
 9        add φ_t [k] from Φ̄_t to Φ_t
10    end
```

With respect to motion model, for any individual i, grouping application 160 may propagate his or her lower-body orientation from time t−1 to t as follows:

$$\phi_t^i = \phi_{t-1}^i + \omega(v_t^i, \phi_{t-1}^i)\Delta T + q \quad (6)$$

where $\phi_t^i$ is the lower-body orientation at time t, obtained from the previous orientation $\phi_{t-1}^i$. The angular velocity $\omega(v_t,\phi_{t-1})$ in equation (6) controls the rate of rotation of the lower body, $\Delta T$ is the time difference from t−1 to t, and q is a small perturbation drawn from a normal distribution $N(0,r)$, with r a small positive number. The angular velocity changes based on the individual's motion and orientation:

$$\omega(v_t^i, \phi_{t-1}^i) = \text{sign}(d2^T d3)\left[\frac{\alpha}{\Delta T}\right] m(v_t^i, \alpha) \quad (7)$$

where, $$\alpha = \arccos(d1^T d3)$$

$$d1 = [\cos(\phi_{t-1}^i)\sin(\phi_{t-1}^i)]^T$$

$$d2 = [-\sin(\phi_{t-1}^i)\cos(\phi_{t-1}^i)]^T$$

$$d3 = v_t^i / \|v_t^i\|$$

$$m(v_t^i, \alpha) = 2\sigma(h(\alpha)\|v_t^i\|) - 1 \quad (8)$$

Figure 7:
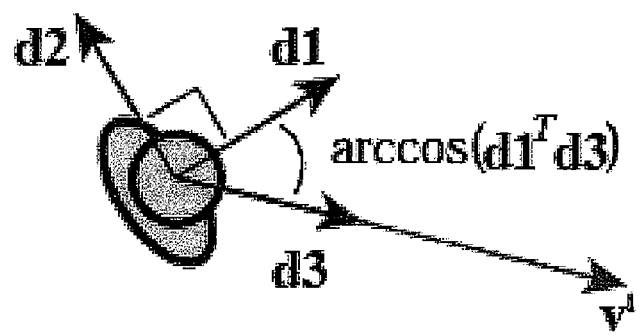
FIG. 7 shows a diagram of an exemplary coordinate system used in the exemplary grouping analysis of FIG. 6, according to one implementation of the present disclosure.

The variable $\alpha$ is the unsigned angular difference between the previous lower-body orientation $\phi_{t-1}^i$ and the current direction of motion on the ground plane. The sign $(d2^T d3)$ component of (7) provides the direction of rotation of the lower body as a individual walks. The geometric relations between d1, d2 and d3 are illustrated in FIG. 7.

The function $m(v_t^i, \alpha)$ in equation (8) returns a number in [0,1) that scales the angular velocity $\omega$, where $\sigma(\cdot)$ is the standard sigmoid function, as defined for equation (1). The function $h(x)$ returns a non-negative scaling constant that further controls the effect of the magnitude of the linear velocity on $\omega$, based on the direction of motion. In practice, grouping application 160 may use $$h(\alpha) = \frac{\pi - a}{\pi},$$

with a>b>0 small fixed constants. This means that when the individual moves backwards ($\alpha \to \pi$), the function h returns a small value and, thus, m is also small. In this manner, the motion model favors small changes in body orientation, in comparison to sudden rotations of 180°.

With respect to context model, the probability of the context $C_t^i$ at time t given the lower body orientation $\phi_t^i$ and position $p_t^i$ is a mixture of three probabilities:

$$p(C_t^i | \phi_t^i, p_t^i) = \begin{bmatrix} w_{group} \\ w_{eng} \\ (1-(w_{group}+w_{eng})) \end{bmatrix}^T \begin{bmatrix} p_{group}(C_t^i|\phi_t^i,p_t^i) \\ p_{eng}(C_t^i|\phi_t^i,p_t^i) \\ \mathcal{VM}(0;\phi_t^i,0) \end{bmatrix}$$

where the weights sum to one. The component $p_{group}(C_t^i|\phi_t^i,p_t^i)$ is the probability that the individual is intersecting his or her transactional segment with a group's o-space, $p_{eng}(C_t^i|\phi_t^i,p_t^i)$ is the probability of orienting the lower body towards another individual or object of interest, and $\mathcal{VM}(0;\phi_t^i,0)$ is a uniform distribution that represents a failure to explain the lower body orientation. The probability $p_{group}(C_t^i|\phi_t^i,p_t^i)$ is another mixture that depends on the o-space centers $M_t$ and the scores $S_t^i$:

$$p_{group}(C_t^i | \phi_t^i, p_t^i) = \qquad (9)$$

$$\sum_{k=1}^{|M|} S_t^i[k]\mathcal{VM}(\beta_k;\phi_t^i,\kappa_{group}) + (1 - \sum_{k=1}^{|M|} S_t^i[k])\mathcal{VM}(0;\phi_t^i,0)$$

where $\beta_k$ is the angle of the unitary vector M[k]/||M[k]|| with respect to the horizontal axis of the world coordinate frame, and $\kappa_{group}>0$ is a parameter that controls the spread of the von Mises (VM) distributions. The last term of equation (9) is very important in two cases: when M is empty; and when the individual's transactional segment is not intersecting any known o-space center, the values of $S_t^i$ are all zero. Grouping application 160 may model $p_{eng}(C_t^i|\phi_t^i,p_t^i)$ as follows:

$$p_{eng}(C_t^i | \phi_t^i, p_t^i) = \sum_{v=1}^{V} e_v \mathcal{VM}(\beta_v;\phi_t,\kappa_{eng}) \quad (10)$$

where $\beta_v$ are the angles in the direction of the other individuals and objects of interest that are directly visible for the individual i within a field of view of 180°. The weights $e_v$ in (10) satisfy $\Sigma_{v=1}^V e_v = 1$, and grouping application 160 may use them to bias $p_{eng}(c_t,\phi_t^i)$:

$$e_v = \text{dist\_weight}(d_v) / \sum_{i=1}^{V} \text{dist\_weight}(d_i) \quad (11)$$

where with $d_v$ the distance to the individual or object v in $C_t^i$. The function dist_weight($d_v$) returns 0.6 if the distance is in the personal or intimate spaces ($d_v \le 1:2$), 0.3 if the distance is in the social space ($1:2 < d_v \le 3:6$), 0.1 if the distance is in the public space ($3:6 < d_v < 7:6$), and 0 otherwise. In the exceptional case that $C_t^i$ contains no visible individual or object of interest within the upper range of the public space, grouping application 160 may evaluate $p_{eng}(C_t^i|\phi_t^i,p_t^i)$ with a uniform distribution (as grouping application 160 may do for $p_{group}$ when M is empty).

With respect to head measurement model, the probability is given by:

$$p(\theta_t^i | \phi_t^i, C_t^i, p_t^i) = w_{front}p_{front}(\theta_t^i | \phi_t^i) + \qquad (12)$$

$$w_{focus}p_{focus}(\theta_t^i | \phi_t^i, C_t^i, p_t^i) + (1 - w_{front} - w_{focus})\mathcal{VM}(\theta_t;0,0)$$

where the weights normalize the mixture. The first component of the model accounts for frontal headings, the second describes the head orientation based on possible foci of attention (or distractions), and the third accounts for unexplained head orientation measurements. In particular, $$p_{front}(\theta_t^i|\phi_t^i) = \mathcal{VM}(\theta_t^i;\phi_t^i,\kappa_{front}) \quad (13)$$

with $\kappa_{front}$ the spread of the distribution. The probability $$p_{focus}(\theta_t^i | \phi_t^i, C_t^i, p_t^i) \propto \max_{v=1...V} \{\mathcal{VM}(\theta_t^i;\beta_v,\kappa_{focus})\} \quad (14)$$

is proportional to the maximum likelihood for orienting the head towards a (non-occluded) individual, object of interest, or most likely o-space center within the field of view. As before, grouping application 160 may assume the field of view to span 180° in front of this individual, and set $p_{focus}$ to $VM(\theta_t^i;0,0)$ if no focus of attention is visible.

Note that individuals may interact with other social entities that can be added to this model, such as other robots. It is also possible to incorporate information about how certain grouping application 160 may are about the location of these targets through the $\kappa$ parameters, though grouping application 160 may use constant values in this work.

Referring to FIG. 6, diagram 600 shows the Bayes network that characterizes the evolution of hidden lower body orientations $\phi^i$ for individual i, based on the linear velocities $v^i$, head orientation measurements $\theta^i$, contextual information $C^i$, and position $p^i$.

Figure 8:
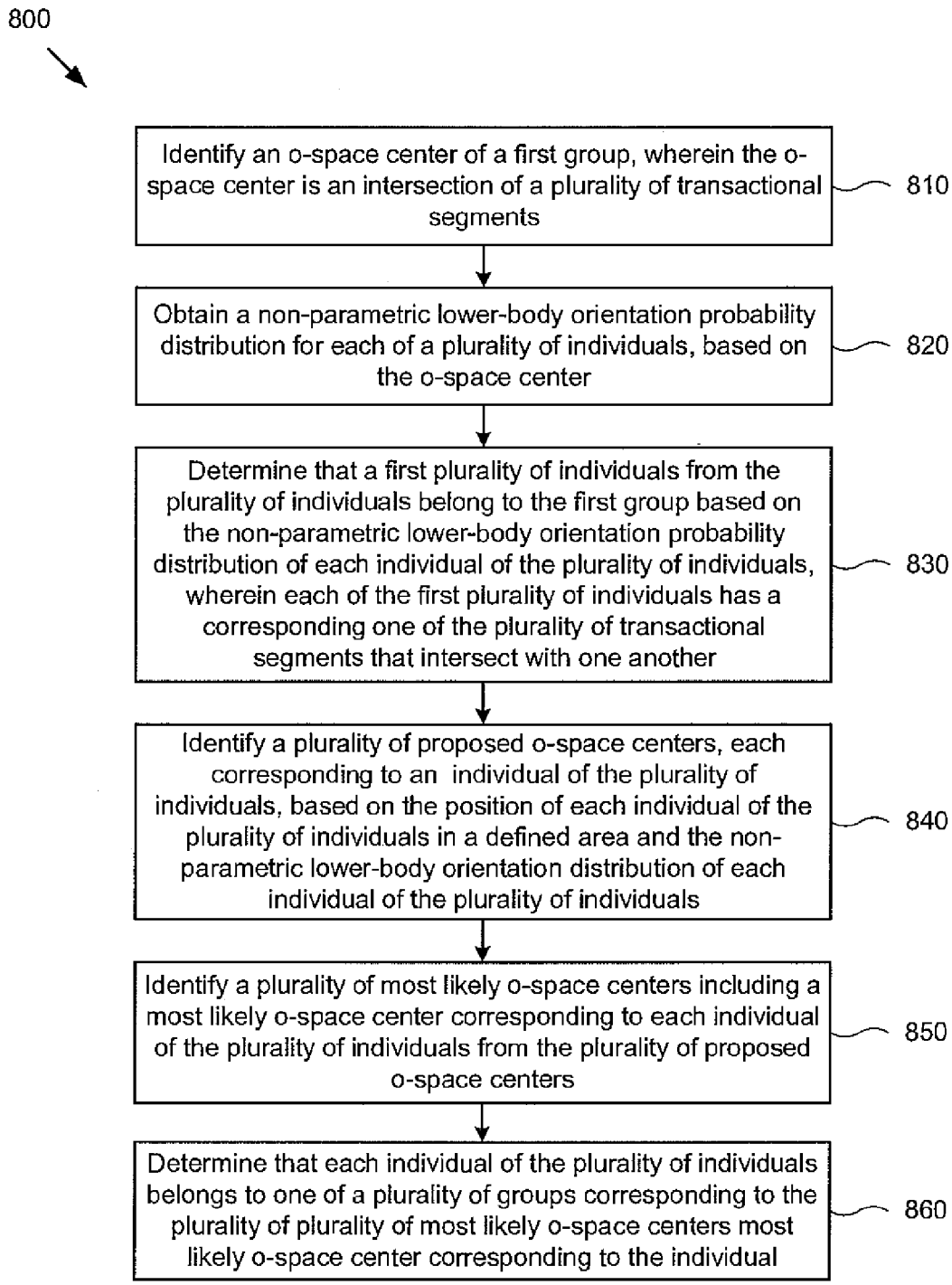
FIG. 8 shows an exemplary flowchart illustrating a method of grouping individuals, according to one implementation of the present disclosure.

FIG. 8 shows an exemplary flowchart illustrating a method of grouping individuals, according to one implementation of the present disclosure. Flowchart 700 describes identifying groups of individuals among a plurality of individuals with reference to Algorithm 1. In some implementations, grouping application 160 may propose an o-space center modeled as normal distributions for each individual i of the plurality of individuals in a defined area based on his or her position $p^i$ in the defined area and lower-body orientation distribution $\Phi^i$, which may be provided as a set of N samples. The proposed o-space centers compose a Gaussian mixture whose 2-D local maxima M may be estimated using the fixed-point mode-finding algorithm, as shown at lines 9-23 of Algorithm 1. Grouping application 160 may consider these modes as proposed o-space centers, and compute for every person in the scene a set of scores $S^i[k]$ that represent the likelihood of intersecting his or her transactional segment with the proposed o-space center k, as shown at line 39 of Algorithm 1.

At 810, computing device 110 identifies an o-space center of a first group of individuals, wherein the o-space center is an intersection of a plurality of transactional segments. A transactional segment may be the region in front of an individual's body that limbs can reach easily, and in which hearing and sight are most effective. In some implementations, the first group of individuals may be part of a plurality of individuals. Among the plurality of individuals, grouping application 160 may identify a first group of individuals and an o-space center corresponding to the first group.

At 820, computing device 110 obtains a non-parametric lower-body orientation probability distribution for each of a plurality of individuals, based on the o-space center. In some implementations, grouping application 160 may estimate each individual's lower-body orientation based on the observations that people tend to orient their lower body towards other people or objects of interest while standing still, people often orient their head in the same direction as their lower body, people can turn their heads temporarily to attend to visible targets other than their main focus of attention, and people tend to orient their lower body towards their direction of motion while walking. Each individual may have a lower-body orientation distribution, which may be a non-parametric lower-body orientation distribution. In some implementations, computing device 110 may use a defined area map to obtain the non-parametric lower-body orientation probability distribution, for example, by considering the location of any objects of interest that may be in the area.

At 830, computing device 110 determines that a first plurality of individuals from the plurality of individuals belong to the first group based on the non-parametric lower-body orientation probability distribution of each individual of the plurality of individuals, wherein each of the first plurality of individuals has a corresponding one of the plurality of transactional segments that intersect with one another. A plurality of individuals belong to a group when their corresponding transactional segments intersect one another and intersect a common o-space center. Accordingly, grouping application 160 may reason from the non-parametric lower-body orientation probability distribution of each individual of the plurality of individuals and the identified o-space center that each individual who has a corresponding transactional segment that intersects the o-space center belongs to the first group.

At 840, computing device 110 identifies a plurality of proposed o-space centers, each corresponding to an individual of the plurality of individuals, based on the position of each individual of the plurality of individuals in a defined area and the non-parametric lower-body orientation distribution of each individual of the plurality of individuals. At 850, computing device 110 identifies a plurality of most likely o-space centers including a most likely o-space center corresponding to each individual of the plurality of individuals from the plurality of proposed o-space centers. Computing device 110 may determine a probability that each individual of the plurality of individuals belongs to any of a plurality of groups corresponding to the plurality of proposed o-space centers. In some implementations, it may be likely that the transactional segment of an individual may intersect at least one o-space center or more than one o-space center. The probabilities that an individual's transactional segment may intersect a plurality of o-space centers make up a discrete probability distribution for soft o-space assignments. Flowchart 800 continues at 860, where computing device 110 determines that each individual of the plurality of individuals belongs to the group corresponding to the most likely o-space center corresponding to the individual. In some implementations, computing device 110 may determine that each individual of the plurality of individuals belongs to the group corresponding to the proposed o-space center that the transactional segment corresponding to the individual has a highest probability of intersecting. If the transactional segment corresponding to the individual does not have a non-zero probability of intersecting an o-space center, computing device 110 may determine the individual does not belong to a group.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for grouping a plurality of individuals, each individual of the plurality of individuals having a corresponding transactional segment, the system comprising:
   a memory storing a group identification executable code;
   a processor for executing the group identification executable code to:
   identify an o-space center of a first group, wherein the o-space center is an intersection of a plurality of transactional segments;
   obtain a non-parametric lower-body orientation probability distribution for each of the plurality of individuals, based on the o-space center;
   determine that a first plurality of individuals from the plurality of individuals belong to the first group based on the non-parametric lower-body orientation probability distribution of each individual of the plurality of individuals, wherein each of the first plurality of individuals has a corresponding one of the plurality of transactional segments that intersect with one another;
   identify a plurality of proposed o-space centers, each corresponding to an individual of the plurality of individuals, based on the position of each individual of the plurality of individuals in a defined area and the non-parametric lower-body orientation distribution of each individual of the plurality of individuals;

identify a plurality of most likely o-space centers including a most likely o-space center corresponding to each individual of the plurality of individuals from the plurality of proposed o-space centers, wherein the most likely o-space center corresponding to each individual of the plurality of individuals is determined by calculating the probability of intersection of the transactional segment corresponding to each individual of the plurality of individuals with each proposed o-space center; and communicate with one or more of the plurality of individuals based on one or more of the identified plurality of most likely o-space centers.

2. The system of claim 1, wherein the processor is further configured to track the non-parametric lower-body orientation probability distribution for a first individual of the plurality of individuals based on at least one of a position of the first individual of the plurality of individuals in the area, a velocity of the first individual of the plurality of individuals in the area, and a head orientation of the first individual of the plurality of individuals in the area.

3. The system of claim 1, wherein the memory additionally stores a map of a defined area and the processor is further configured to track the non-parametric lower-body orientation probability distribution for each individual of the plurality of individuals located in the defined area based on the map of the defined area.

4. The system of claim 1, wherein the first group is an F-formation group.

5. The system of claim 1, wherein a lower-body orientation of each individual of the plurality of individuals in the area is non-observable.

6. The system of claim 1, wherein the processor is further configured to detect a plurality of groups among the plurality of individuals.

7. The system of claim 6, wherein each group of the plurality of groups includes a plurality of members.

8. The system of claim 1, wherein the system is part of a robot.

9. The system of claim 1, wherein the processor executes the group identification executable code using images to identify the o-space center of the first group, and to obtain the non-parametric lower-body orientation probability distribution.

10. A system for grouping a plurality of individuals, each individual of the plurality of individuals having a corresponding transactional segment, the system comprising:

a memory storing a group identification executable code;
a processor for executing the group identification executable code to:
identify an o-space center of a first group, wherein the o-space center is an intersection of a plurality of transactional segments;
obtain a non-parametric lower-body orientation probability distribution for each of the plurality of individuals, based on the o-space center;
determine that a first plurality of individuals from the plurality of individuals belong to the first group based on the non-parametric lower-body orientation probability distribution of each individual of the plurality of individuals, wherein each of the first plurality of individuals has a corresponding one of the plurality of transactional segments that intersect with one another;
identify a plurality of proposed o-space centers, each corresponding to an individual of the plurality of individuals, based on the position of each individual of the plurality of individuals in a defined area and the non-parametric lower-body orientation distribution of each individual of the plurality of individuals;
identify a plurality of most likely o-space centers including a most likely o-space center corresponding to each individual of the plurality of individuals from the plurality of proposed o-space centers;
determine that each individual of the plurality of individuals belongs to one of a plurality of groups corresponding to the plurality of plurality of most likely o-space centers most likely o-space center corresponding to the individual; and
communicate with one or more of the plurality of individuals based on determining that the one or more of the plurality of individuals belong to the one of the plurality of groups.

11. A method of identifying free-standing conversational groups among a plurality of individuals in an area, using a system having a memory and a processor, the method comprising:

identifying, using the processor, an o-space center of a first group, wherein the o-space center is an intersection of a plurality of transactional segments;
obtaining, using the processor, a non-parametric lower-body orientation probability distribution for each of the plurality of individuals, based on the o-space center;
determining, using the processor, that a first plurality of individuals from the plurality of individuals belong to the first group based on the non-parametric lower-body orientation probability distribution of each individual of the plurality of individuals, wherein each of the first plurality of individuals has a corresponding one of the plurality of transactional segments that intersect with one another;
identifying, using the processor, a plurality of proposed o-space centers, each corresponding to an individual of the plurality of individuals, based on the position of each individual of the plurality of individuals in a defined area and the non-parametric lower-body orientation distribution of each individual of the plurality of individuals;
identifying, using the processor, a plurality of most likely o-space centers including a most likely o-space center corresponding to each individual of the plurality of individuals from the plurality of proposed o-space centers, wherein the most likely o-space center corresponding to each individual of the plurality of individuals is determined by calculating the probability of intersection of the transactional segment corresponding to each individual of the plurality of individuals with each proposed o-space center; and
communicating with one or more of the plurality of individuals based on one or more of the identified plurality of most likely o-space centers.

12. The method of claim 11, wherein the processor is further configured to track the non-parametric lower-body orientation probability distribution for a first individual of the plurality of individuals based on at least one of a position of the first individual of the plurality of individuals in the area, a velocity of the first individual of the plurality of individuals in the area, and a head orientation of the first individual of the plurality of individuals in the area.

13. The method of claim 11, wherein the memory additionally stores a map of a defined area and the processor is further configured to track the non-parametric lower-body orientation probability distribution for each individual of the plurality of individuals located in the defined area based on the map of the defined area.

14. The method of claim 11, wherein the first group is an F-formation group.

15. The method of claim 11, wherein a lower-body orientation of each individual of the plurality of individuals in the area is non-observable.

16. The method of claim 11, further comprising:
    detecting, using the processor, a plurality of groups among the plurality of individuals, wherein each group of the plurality of groups includes a plurality of members.

17. The method of claim 11, wherein the method is performed by a robot including the system.

18. The method of claim 11, wherein the method uses images to identify the o-space center of the first group, and to obtain the non-parametric lower-body orientation probability distribution.

19. A method of identifying free-standing conversational groups among a plurality of individuals in an area, using a system having a memory and a processor, the method comprising:
    identifying, using the processor, an o-space center of a first group, wherein the o-space center is an intersection of a plurality of transactional segments;
    obtaining, using the processor, a non-parametric lower-body orientation probability distribution for each of the plurality of individuals, based on the o-space center;
    determining, using the processor, that a first plurality of individuals from the plurality of individuals belong to the first group based on the non-parametric lower-body orientation probability distribution of each individual of the plurality of individuals, wherein each of the first plurality of individuals has a corresponding one of the plurality of transactional segments that intersect with one another,
    identifying, using the processor, a plurality of proposed o-space centers, each corresponding to an individual of the plurality of individuals, based on the position of each individual of the plurality of individuals in a defined area and the non-parametric lower-body orientation distribution of each individual of the plurality of individuals;
    identifying, using the processor, a plurality of most likely o-space centers including a most likely o-space center corresponding to each individual of the plurality of individuals from the plurality of proposed o-space centers;
    determining, using the processor, that each individual of the plurality of individuals belongs to one of a plurality of groups corresponding to the plurality of plurality of most likely o-space centers most likely o-space center corresponding to the individual; and
    communicating with one or more of the plurality of individuals based on determining that the one or more of the plurality of individuals belong to the one of the plurality of groups.

* * * * *